United States Patent [19]
Vahabzadeh et al.

[11] Patent Number: 5,180,340
[45] Date of Patent: Jan. 19, 1993

[54] GUIDE MECHANISM FOR A TRAVELING CHAIN TRANSMISSION

[75] Inventors: Hamid Vahabzadeh, Oakland; Erkki A. Koivunen, Livonia, both of Mich.

[73] Assignee: General Motors Corporation, Detroit, Mich.

[21] Appl. No.: 808,245

[22] Filed: Dec. 16, 1991

Related U.S. Application Data

[63] Continuation-in-part of Ser. No. 786,148, Oct. 31, 1991.

[51] Int. Cl.$^5$ .............................................. F16H 7/08
[52] U.S. Cl. .................................... 474/111; 474/140
[58] Field of Search ............... 474/78, 111, 140, 134

[56] References Cited

U.S. PATENT DOCUMENTS

| | | | |
|---|---|---|---|
| 2,129,107 | 9/1938 | Taylor | 474/111 X |
| 2,210,276 | 8/1940 | Bremer | 474/111 X |
| 3,136,169 | 6/1964 | Karger et al. | 474/111 X |
| 3,869,138 | 3/1975 | Allison | 474/111 X |

Primary Examiner—Thuy M. Bui
Attorney, Agent, or Firm—Donald F. Scherer

[57] ABSTRACT

A traveling chain transmission system for effecting a driving connection between laterally spaced driving and driven shaft. A first wheel is mounted on the driving shaft, and a second wheel is mounted on the driven shaft. Each of the wheel have substantially identical pitch diameters. An endless, flexible torque transmitting operatively connects the first and second wheel. A traveling insert band circumscribes and operatively engages one of the wheel at a time, and when the traveling insert band engages one of the wheel, the insert band is located radially inwardly of the endless flexible torque transmitting. The traveling insert band has leading and trailing ends located in substantially circumferentially opposed juxtaposition when the traveling insert band operatively engages one of the wheel. Derailing and locking members are also provided selectively to derail the leading end of the traveling insert band from that wheel operatively engaged thereby. The traveling insert band is adapted, when its leading end is derailed from one of the wheel to travel to the other of the wheel and to circumscribe and operatively engage the other wheel radially inwardly of the endless torque transmitting thereby providing a different speed ratio between said driving and driven shafts.

3 Claims, 9 Drawing Sheets

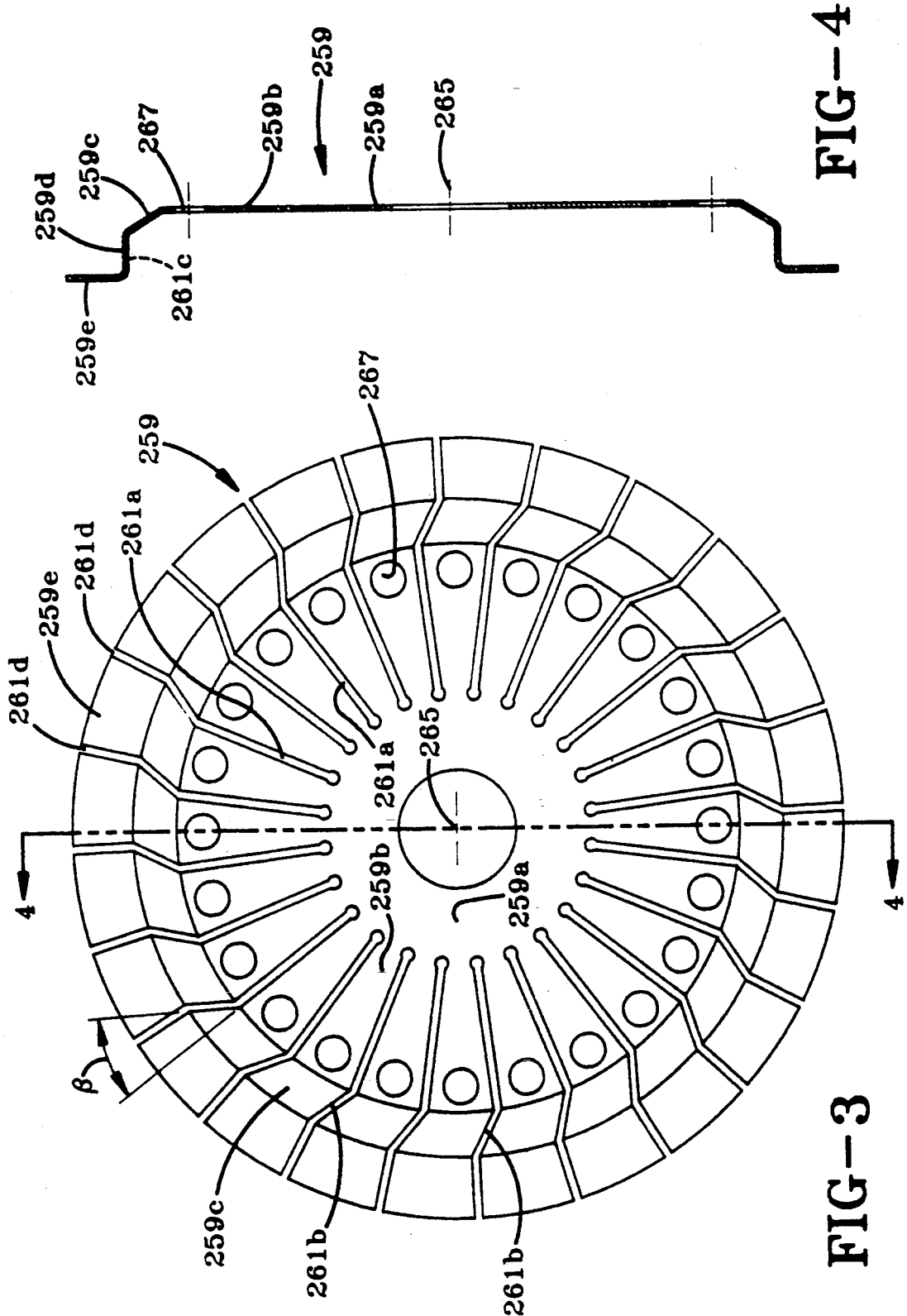

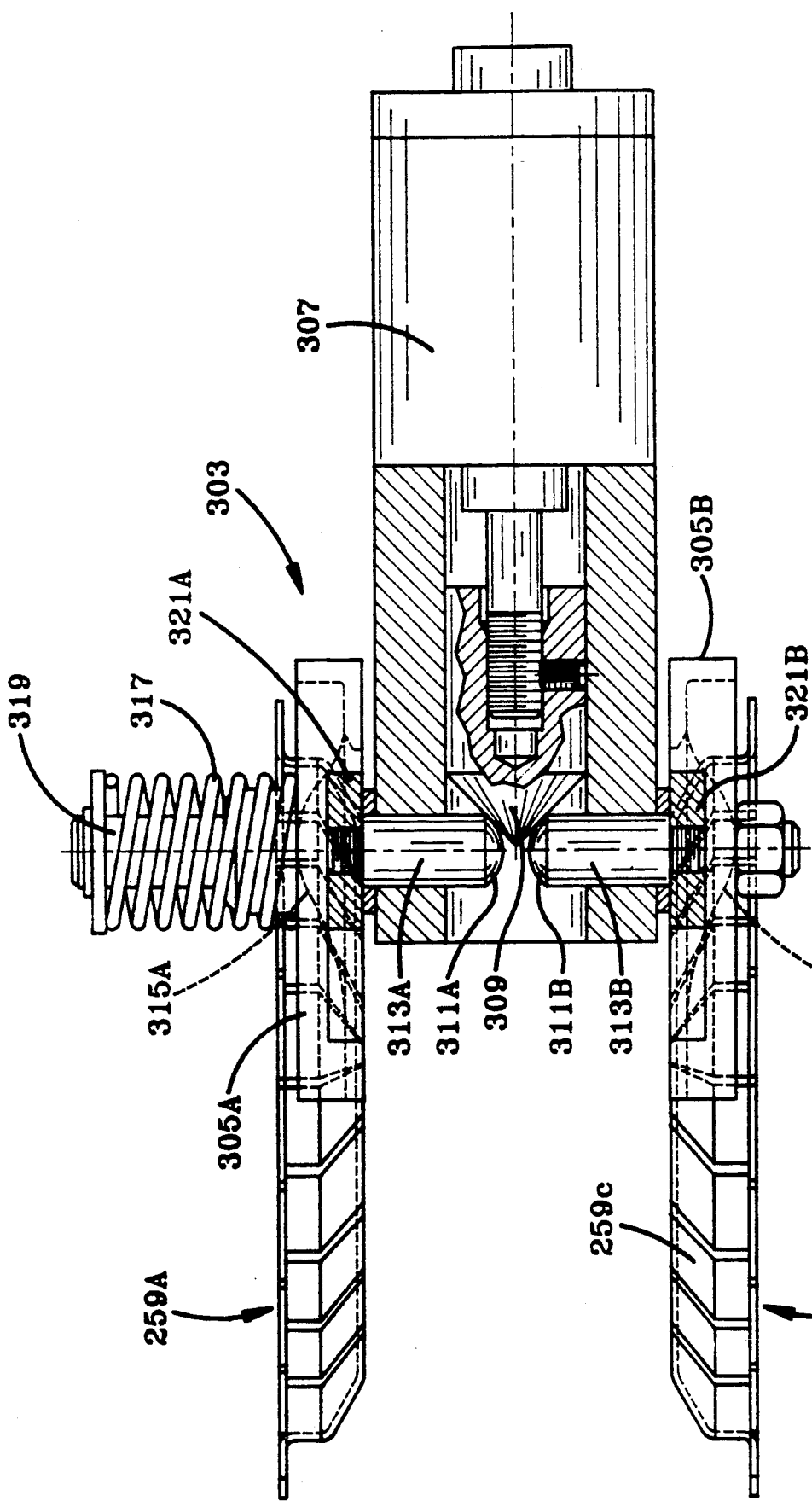

GUIDE MECHANISM FOR A TRAVELING CHAIN TRANSMISSION

This is a continuation-in-part of application U.S. Ser. No. 07/786,148, filed Oct. 31, 1991.

TECHNICAL FIELD

The present invention relates generally to a novel and unique guide for a traveling chain transmission system. More particularly, the present invention relates to a torque transmission system utilizing an endless chain to effect an operative drive between two torque transfer sprockets mounted, respectively, on laterally spaced, driving and driven shaft means. Specifically, the present invention relates to the use of a self-adjusting guide mechanism for a traveling chain which is selectively movable between the two sprockets during operation of the transmission, to effect a predetermined change in the operative pitch diameters of the sprockets and thereby provide a two-speed drive ratio between the driving and the driven shafts by selective placement of the traveling chain about one or the other of the sprockets.

BACKGROUND OF THE INVENTION

Torque transmission systems which interconnect a drive shaft to a parallel, driven shaft conventionally employ chain or belt torque transfer systems which operatively connect the parallel shafts, each of which has a sprocket or pulley of different pitch diameter to produce a fixed-speed drive ratio therebetween. To provide even a two-speed drive ratio between such shafts has historically required a rather complex arrangement of gears and torque transfer devices, the latter generally comprising clutches and/or brakes. To change the speed of the drive ratios with the prior known arrangements has required shift clutches and intermeshing gears with bearings and rotating components, each of which contribute to losses in overall efficiency.

Another somewhat less expensive but no less technically complex arrangement has employed multiple sprockets on each shaft. In that arrangement, the sprockets on one shaft are each aligned with sprockets on the other shaft, and a chain drive selectively interconnects the aligned pairs of sprockets. A derailleur selectively transfers engagement of the chain drive between the aligned pairs of sprockets so that the drive ratios can be selected between those provided by the pairs of aligned sprockets.

Because of the costs to manufacture and maintain, the prior art arrangements as well as the need to remove the load during the shift, many parallel shaft installations are simply provided with a fixed-speed drive ratio. Such a fixed-speed drive ratio provides a weighted average or compromise between the highest and lowest drive ratios desired for a particular installation. In short, the prior known structural arrangements which provide selective drive ratios are overly sophisticated and overly expensive to be employed in many torque transmission systems for which they are desired, and for which they would be beneficial, were it not for the overall costs and complexity of the structures heretofore available for providing selective drive ratios.

SUMMARY OF THE INVENTION

It is, therefore, a primary object of the present invention to provide a novel and unique self-adjusting guide mechanism for a traveling chain transmission system.

It is another object of the present invention to provide a novel guide mechanism for a traveling chain transmission system, as above, in which a variable length path is provided between drive and driven sprockets for controlling the transfer path of the traveling chain.

These and other objects of the invention, as well as the advantages thereof over existing and prior art forms, which will be apparent in view of the following detailed specification, are accomplished by means hereinafter described and claimed.

In general, a traveling chain torque transmission system embodying the concepts of the present invention is adapted to be operatively interconnected between a pair of laterally spaced parallel shafts. Sprockets are mounted on each shaft, and an endless flexible torque transmitting chain mechanism operatively connects the two sprockets.

A traveling chain insert band means selectively circumscribes one or the other of the sprockets radially inwardly of the endless flexible torque transmitting chain mechanism. The traveling chain has free leading and trailing ends which are normally disposed in circumferential opposition when the traveling insert band means circumscribes either of the sprockets. The traveling insert chain is adapted, when its leading end is disengaged from the sprocket, to travel to the other sprocket along a guide system comprising a flexible path and then progressively circumscribe that sprocket. The guide system incorporates pivotally mounted frame blocks which present guide rails for the traveling chain between the sprockets.

An exemplary embodiment of the present guide mechanism of the traveling chain torque transmission system is described herein, and this embodiment is deemed sufficient to effect a full disclosure of the subject invention.

BRIEF DESCRIPTION OF THE DRAWINGS

FIG. 3 is a side elevation of a resilient disk which serves as a key element in the derailing and locking mechanism employed by the torque transmission system depicted.

FIG. 4 is a vertical cross section taken substantially along line 4—4 of FIG. 3.

FIG. 12 is an enlarged cross section taken substantially along line 12—12 of FIG. 11.

DESCRIPTION OF AN EXEMPLARY EMBODIMENT

Figure 1:
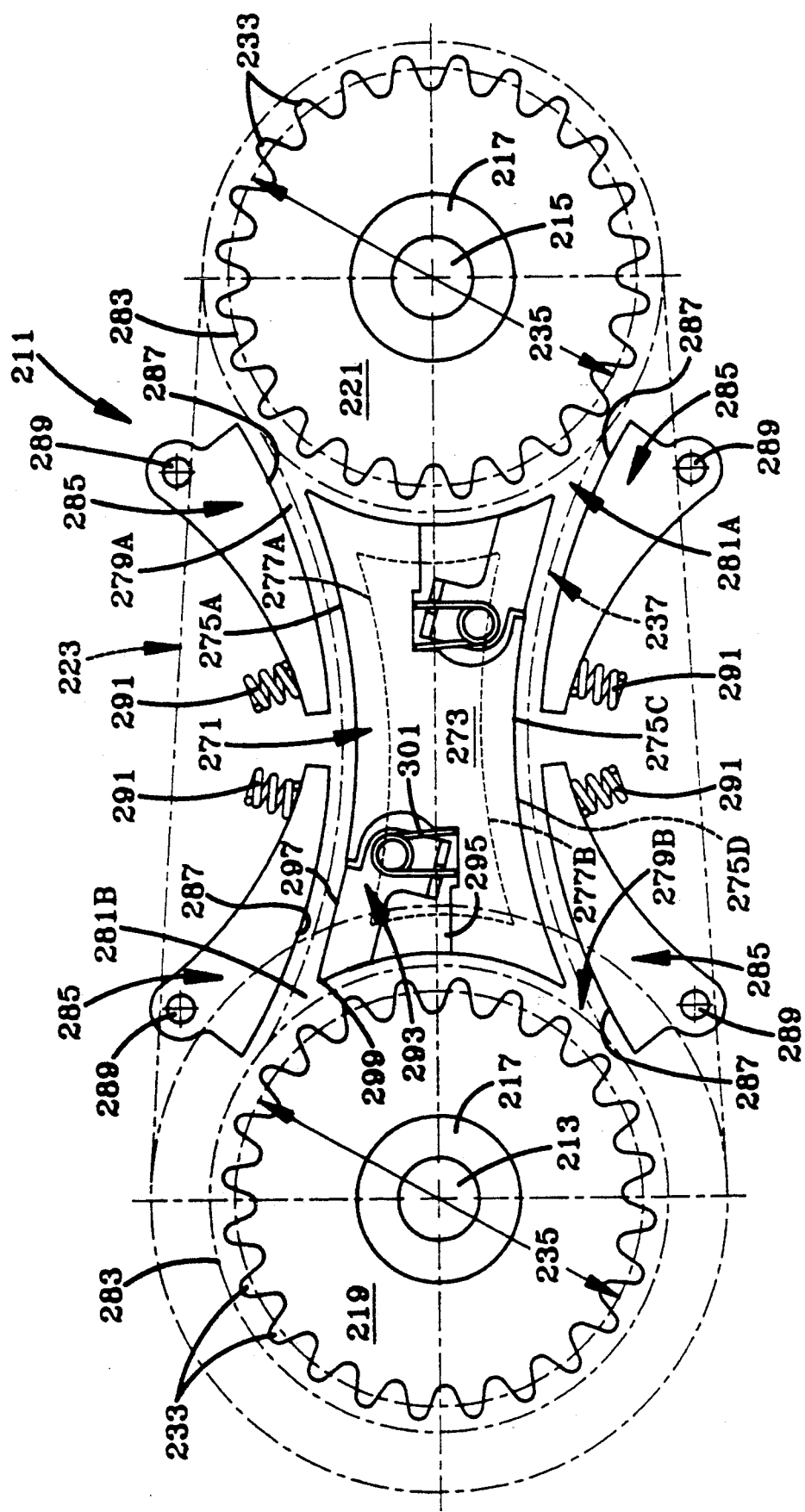
FIG. 1 is a schematic side elevation of a torque transmission system depicting an insert band in the nature of a traveling chain circumscribing a sprocket attached to the driving shaft to provide the maximum overdrive gear ratio, the traveling chain being depicted in chain line, as is the endless flexible torque transmitting means which is operatively connected between a pair of sprockets.

A traveling chain torque transmission system which embodies the concepts of the present invention is identified in FIGS. 1 through 12 by the numeral 211. The system 211 is employed to effect a driving connection between two parallel shafts 213 and 215 which are identified as the driving and the driven shafts, respectively. Each shaft 213 and 215 may also be mounted for rotation on a bearing assembly 217. Torque transfer sprockets 219 and 221 are operatively secured to the respective shafts 213 and 215.

Figure 5:
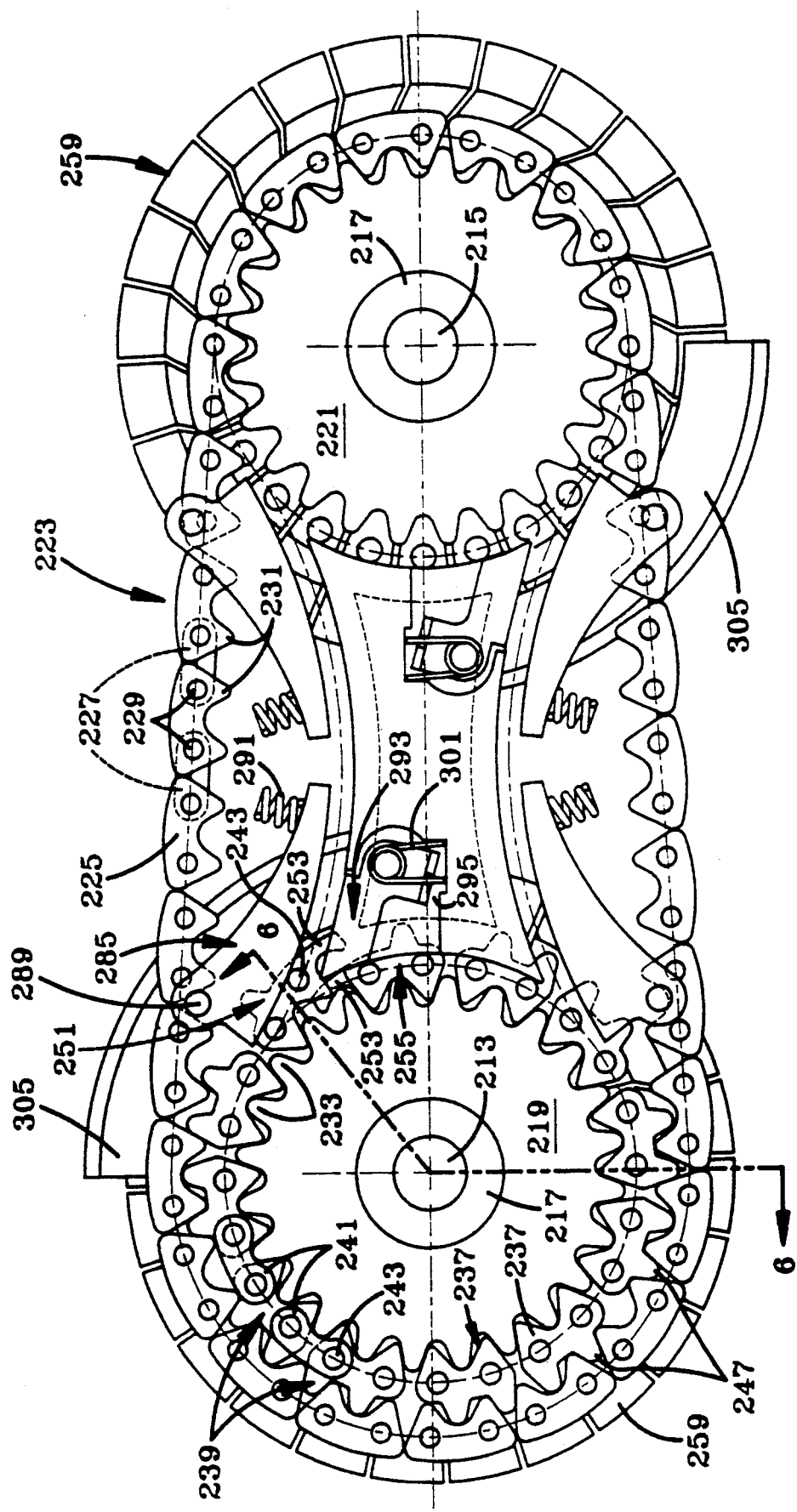
FIG. 5 is a further schematic similar to FIG. 2, but depicting the components in greater detail, both the traveling chain and the endless flexible torque transmitting means in the nature of a chain being depicted in side elevation.
Figure 9:
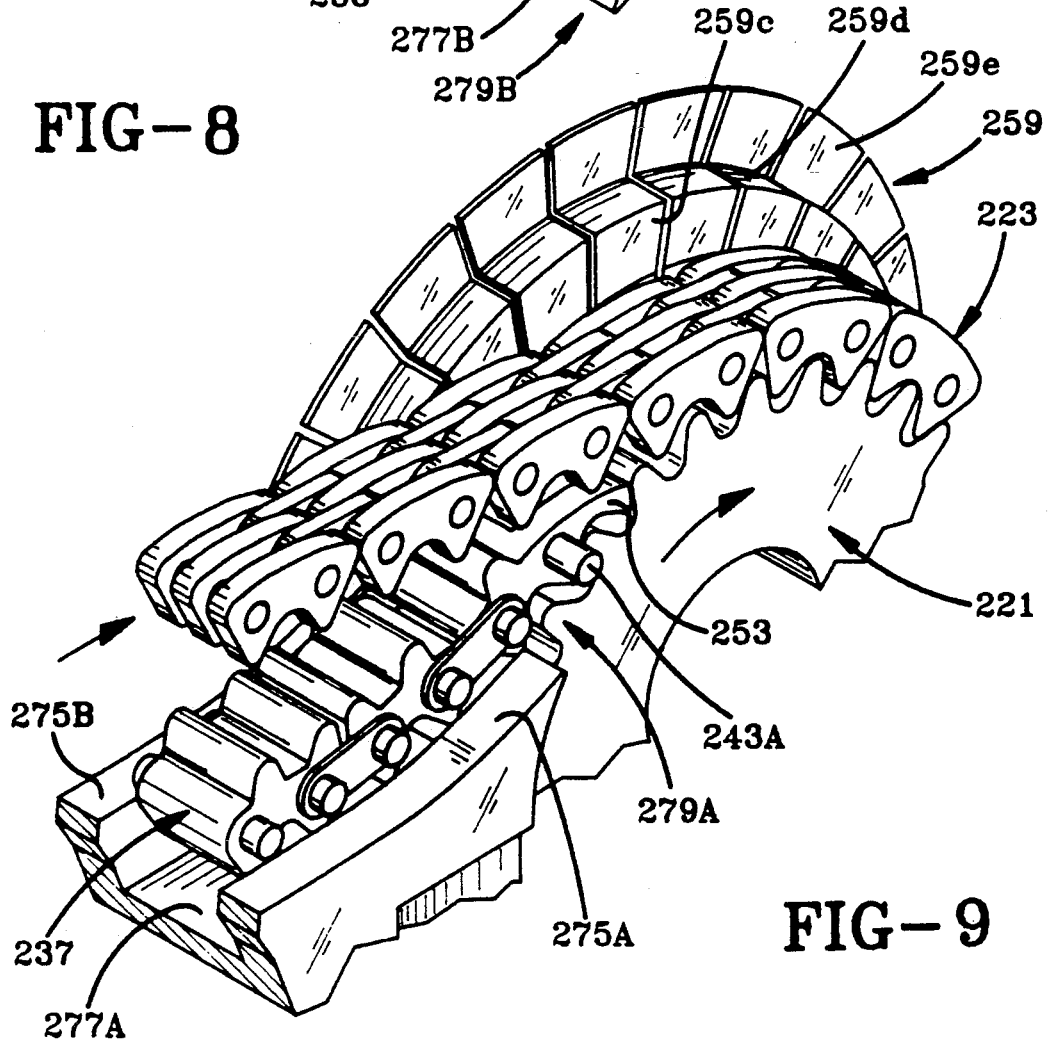
FIG. 9 is a perspective view similar to FIG. 8, but depicting the insertion of the tongue on the leading end block between the sprocket and the endless drive chain.

In the embodiment described, the sprockets 219, 221 also have the same pitch diameter 235 and are connected by an endless, flexible torque transmitting means 223 (FIG. 5) which may be a conventional silent drive chain which meshes with the teeth 233 on each sprocket 219 and 221. That is, and as best seen in FIGS. 5 and 9, the endless drive chain 223 may be comprised of a plurality of toothed links 225 conjoined by connecting links 227 and connecting pins 229. In order to minimize the complexity of the drawings, only two representative connecting links 227 are depicted in FIG. 5.

It should also be understood that the toothed links 225 may be fashioned from solid blocks attached by a pair of external connecting links (not shown), or as shown, the drive chain 223 may comprise stacked toothed and connecting links, as is customarily employed in the typical silent chain configuration. In either arrangement, each toothed link 225 presents a pair of teeth 231 which have a pitch dimension determined by the length of the toothed links 225 taken in conjunction with the length of the connecting links 227 so that the teeth 231 will mesh with the teeth 233 on each sprocket 219 and 221.

A traveling chain 237 (FIG. 2) is comprised of a plurality of unique insert load transfer blocks 239 which cooperatively interact with the teeth 233 on each sprocket 219 and 221, as well as with the teeth 231 (FIG. 5) on the endless drive chain 223. The thickness of the load transfer blocks 239 increases the effective pitch diameter from that which is designated by the numeral 235 in FIG. 1 to that which is designated by the numeral 245 in FIG. 2 of whichever sprocket 219 or 221 is circumscribed by the traveling chain 237—the thickness of the load transfer blocks 239 being measured radially with respect to the sprocket about which the traveling chain 237 is circumscribed.

The successive insert load transfer blocks 239 are conjoined by connector links 241, laterally spaced pairs of which embrace a portion of the lateral sides on two successive blocks and are pivotally attached to each block by pins 243. It will be observed that only one of the connector links 241 is depicted in FIG. 2 in order to minimize the clutter that would result if all the connector links 241 were included on that figure.

It must be understood that, in the torque transmission system 211, the pins 243 serve a dual purpose in that they not only effect a pivotal connection between each transfer block 239 and the connector links 241 by which the load transfer blocks 239 are joined, but they are also utilized to effect the blocking and derailing modes, as will be hereinafter more fully explained.

Figure 2:
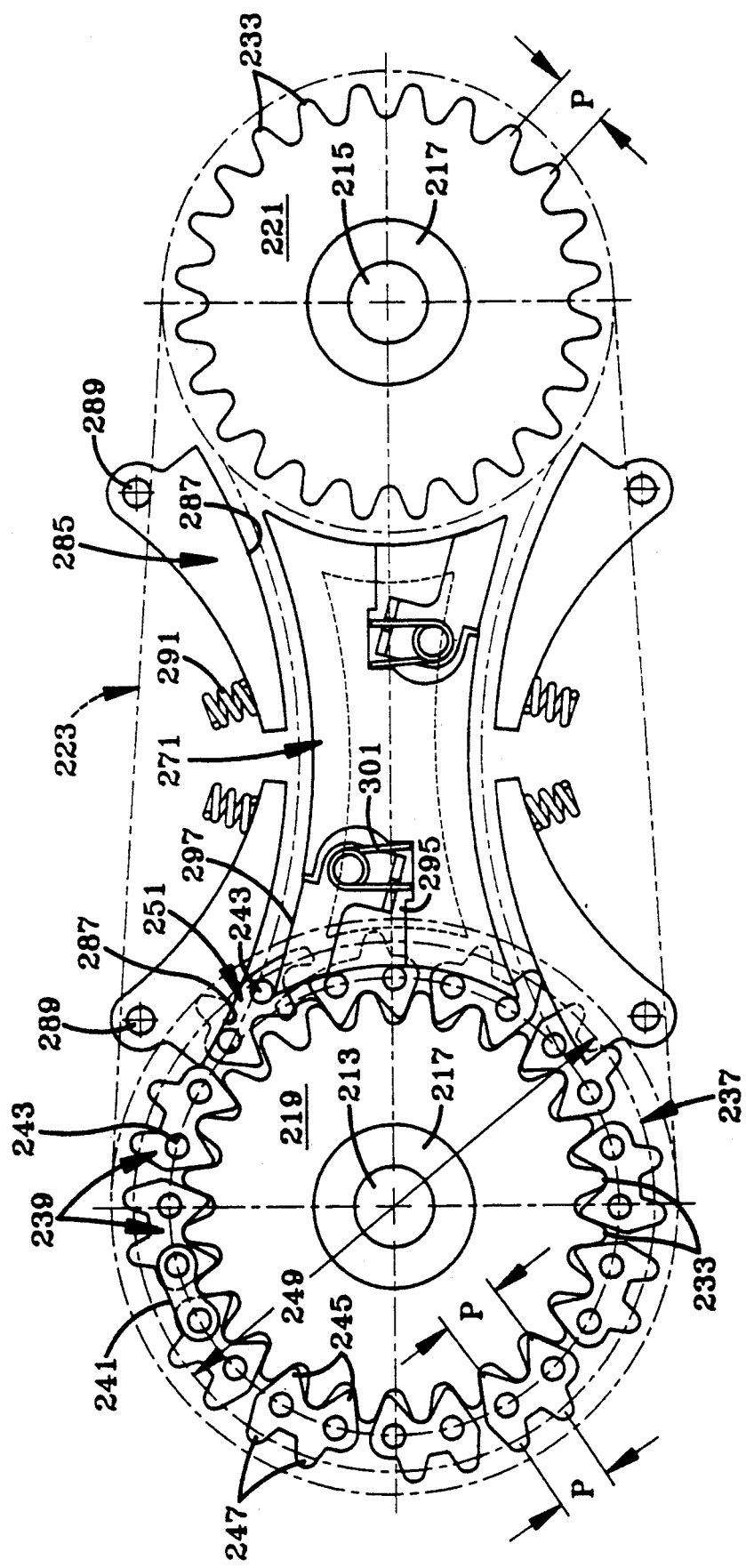
FIG. 2 is a schematic side elevation similar to FIG. 1, but depicting the system in the derailing mode, which permits the leading end of the traveling chain to disengage from the sprocket on the driving shaft, the traveling chain now being depicted in side elevation but the endless flexible torque transmitting means continues to be depicted in chain line.

As may most clearly be seen in FIG. 2, a pair of radially inwardly directed teeth 245 are presented from each load transfer block 239. The pitch dimension "P" for the teeth 245 must be equal to the pitch dimension "P" for the teeth 233 on each of the sprockets 219 and 221 to effect meshing engagement between each load transfer block 239 and either sprocket 219 or 221. As such, the length of the connector links 241 will be selected to permit the desired articulation between successive load transfer blocks 239 and also to assure that the successive load transfer blocks 239 mesh with the sprockets 219 and 221.

Continued reference to FIG. 2 reveals that each load transfer block 239 also presents a pair of outwardly directed cogs 247. The pitch dimension "P" between the successive cogs 247 on each insert load transfer block 239 is selected to be exactly equal to the pitch dimension "P" between the teeth 233 on each sprocket 219 and 221. As such, the cogs 247 on each insert load transfer block 239 will meshingly engage with the teeth 231 on the endless drive chain 223 as represented in FIG. 5.

However, it should be appreciated that when the traveling chain 237 is inserted between either sprocket 219 or 221 and the endless drive chain 223, that sprocket 219 or 221 will thereby have an increased effective pitch diameter 249 (FIG. 2). The increase in the pitch diameter is proportional to the thickness of the traveling chain 237. To accommodate for this difference in the effective pitch diameters 235 and 249 of the sprockets when the traveling chain 237 is circumscribed in whole or in part about one of the sprockets 219 or 221, the thickness of the traveling chain 237 may be judiciously selected such that the insert blocks 239 may effectively utilize nonsymmetrical placement of the cogs 247 to effect a nonbinding, torque transfer between the traveling chain 237 and the drive chain 223.

As best shown in FIG. 5, the nonsymmetrical placement of the cogs 247, if the dimensions are properly selected, permits successive insert load transfer blocks 239 to be reversed such that the successive insert load transfer present mirror images of each other. This arrangement allows all insert load transfer blocks 239 to be identical. As such, when the traveling chain 237 is interposed between either sprocket 219 or 221 and the endless drive chain 223, every fourth and fifth tooth 231 on the endless drive chain 223 will only be engaged by one cog 247, also as shown in FIG. 5.

In other words, because the cogs 247 mesh with the teeth 231 on the drive chain 223, the pitch dimension for the cogs 247 must also equal dimension "P". To provide the same pitch dimension on both sides of the traveling chain 237 the load transfer blocks 239 have an asymmetrical design; viz., the two cogs 247 on each load transfer block 239 are offset with respect to the center of each block 239. As such, when the traveling chain 237 circumscribes either sprocket 219 or 221, a fictitious cog wheel is presented wherein a cog is missing at predetermined circumferential locations.

Figure 8:
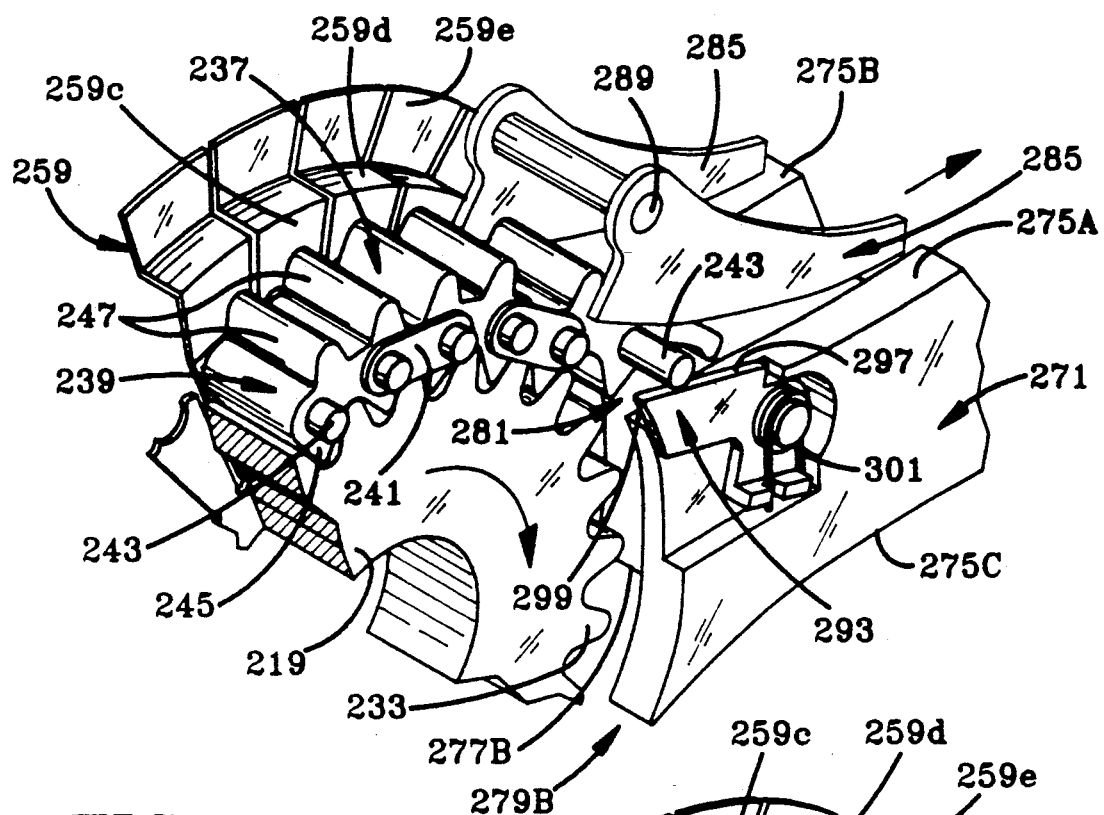
FIG. 8 is a perspective view of the mechanism depicted in side elevation in FIG. 7.

As best seen in FIGS. 5, 8 and 9, the traveling chain 237 also has a leading end block 251, which presents a tongue 253, and a trailing end block 255 (FIG. 5), which also presents a tongue 253. The leading and trailing end blocks 251 and 255 may also be identical. Hence, when the blocks 251 and 255 are disposed at opposite ends of the traveling chain 237 and are disposed in circumferential opposition, the tongues 253 on the leading and trailing end blocks 251 and 255 lie in adjacent juxtaposition. As will become apparent, the tongues 253 provide a smooth penetration of the traveling chain 237 to a position where it is interposed between the drive chain 223 and either sprocket 219 or 221, as well as a smooth exit as the traveling chain 237 leaves one sprocket for the other. The smooth penetration so provided assures a positive synchronous engagement of the traveling chain 237 with not only the drive chain 223 but also the sprockets 219 or 221.

In order to maintain the traveling chain 237 in operative, peripheral engagement with the sprocket 219 or 221, a containment means 257 (FIG. 6) is provided. The containment means 257 must act in concert with the insert load transfer blocks 239 and/or the reaction pins 243 presented from the traveling chain 237 to maintain the traveling chain 237 in operative engagement with whichever of the sprockets 219 or 221 about which it is received. An ejection means, as hereinafter more fully described, may be employed in association with the containment means 257 effectively to direct the leading end block 251 outwardly and away from the sprocket about which the traveling chain 237 is circumscribed.

The containment means 257 utilized with the torque transfer system 211, depicted in FIGS. 1 through 12, incorporates a resilient disk 259 (FIGS. 3 and 4) that is secured to at least one side of each sprocket 219 and 221. As shown, however, both sprockets 219 and 221 are embraced between resilient disks 259 in the nature of Belleville springs that are secured to opposite sides of each sprocket 219 and 221.

FIG. 3 is an elevational view of one of the resilient disks 259. Each resilient disk 259 has a series of circumferentially spaced generally radially extending offset slots 261. Portion 261a of each slot 261 emanates from the generally planar central body portion 259a and extends radially outwardly to define a pie-shaped segment 259b between the portion 261a of each slot 261. Each portion 261b is inclined from a radial reference at a projected angle beta (FIG. 3) and each portion 261b extends between the circumferentially successive cam follower portions 259c. The cam follower portions 259c are inclined laterally with respect to the central body portions 259a and the coplanar segments 259b, as is best represented in FIG. 4.

The radially outermost extent of each cam follower portion 259c joins a laterally oriented extender portion 259d and the adjacent extender portions 259d are separated by portion 261c of the slot 261. The extender portions 259d compositely form a discontinuous annulus which is interrupted by the circumferentially spaced portions 261c of slot 261. Each portion 261c may lie within a radial plane which includes the rotational axis 265 of the disk 259. An end portion 259e extends radially outwardly from each extender portion 259d, and as such, the end portions 259e may lie in a plane that is substantially parallel to, but laterally offset from, the planar central portion 259a and the segments 259b. The outer end portions 259e are separated by a radially extending portion 261d of the slot 261.

A series of engaging apertures 267 are disposed in a circular disposition concentrically about the rotational axis 265 of the resilient disk, which is coincident with the rotational axis of each sprocket 219 and 221, and the apertures 267 are circumferentially spaced such that one aperture 267 is located in each segment 259b. The apertures 267 in the resilient disks 259 cooperate with the reaction pins 243 to serve as the containment means 257 and to retain the traveling chain 237 on one or the other of the sprockets 219 or 221. As will become apparent, the inclined portions 261b of the offset slot 261 are provided and oriented to prevent the reaction pins 243 from having to cross any of the slots 261, particularly as the ends of the pins 243 engage and slide along the cam follower 259c and the segment 259b of the resilient disk 259 during the process of moving to engage the apertures 267.

Referring again to FIG. 1, guide means 271 are employed to direct the traveling chain 237 between the laterally spaced sprockets 219 and 221. The guide means 271 employs a central frame block 273 that may be supported in any manner convenient to the environment in which the system 211 is employed. The lateral sides of the central frame block 273 presents tracks or guide rails 275 which are raised above and extend laterally along the recessed upper and lower surfaces 277A and 277B of the block 273, and which extend arcuately between the sprockets 219 and 221.

As is depicted in FIGS. 1 and 8, the central frame block 273 presents curved tracks 275A and 275B which are raised above and extend along the recessed upper surface 277A. Likewise, curved tracks 275C and 275D are raised above and extend along the recessed lower surface 277B. As such, the tracks 275 extend between the sprockets 219 and 221 to define the runs of the traveling chain 237. The opposite ends of each track 275 present ingress and egress spans 279 and 281 (FIG. 1) which are open, and communicate with, the paths along which the traveling chain 237 will move during a shift, as will be hereinafter more fully described.

It should be understood that when the interaction between the traveling chain 237 and the sprockets 219 and 221 is accomplished by teeth 245, as is the situation in torque transfer system 211, the tracks 275 must be arcuate to direct the traveling chain 237 away from the endless drive chain 223 during the movement of the traveling chain 237 as it transfers between the sprockets 219 and 221. In that regard, it has been found that the arc of each track 275 should preferably be tangent to the pitch circle 283 of each sprocket 219 or 221. Penetration of the traveling chain 237 along that tangent assists in the facile operation of the transmission system 211, as will also be hereinafter more fully explained.

Tensioners 285 are mounted in opposition to each track 275. Each tensioner 285 has an arcuate engaging surface 287 disposed in opposition to one of the tracks 275. Each tensioner 285 is pivotally mounted, as by a pivot pin 289, and is biased, as by the compression spring 291, such that the arcuate engaging surface 289 is biased toward but in generally spaced relation with respect to, the opposed track 275.

Ejectors 293 may also be employed. When provided, each ejector 293 will be received in a recess 295 formed adjacent and along the outside of each track 275 in proximity to the egress span 281. Each ejector 293 will have a directing surface 297 which terminates in an apex 299. The apex 299 is disposed in close proximity to and radially outwardly from the traveling chain 237 as that chain circumscribes either sprocket 219 or 221 while being retained thereon by the containment means 257; i.e., as shown at the interaction between the resilient disk 259 and the reaction pins 243. A coil spring 301 normally biases the ejector 293 such that the directing surface 297 is normally disposed to lie along the adjacent track 275.

However, in response to the application of any force to the apex 299 or the directing surface 297, the ejector 293 will pivot against the biasing action of the coil spring 301 to swing toward the adjacent sprocket 219 or 221 for a purpose that will shortly become apparent.

Figure 6:
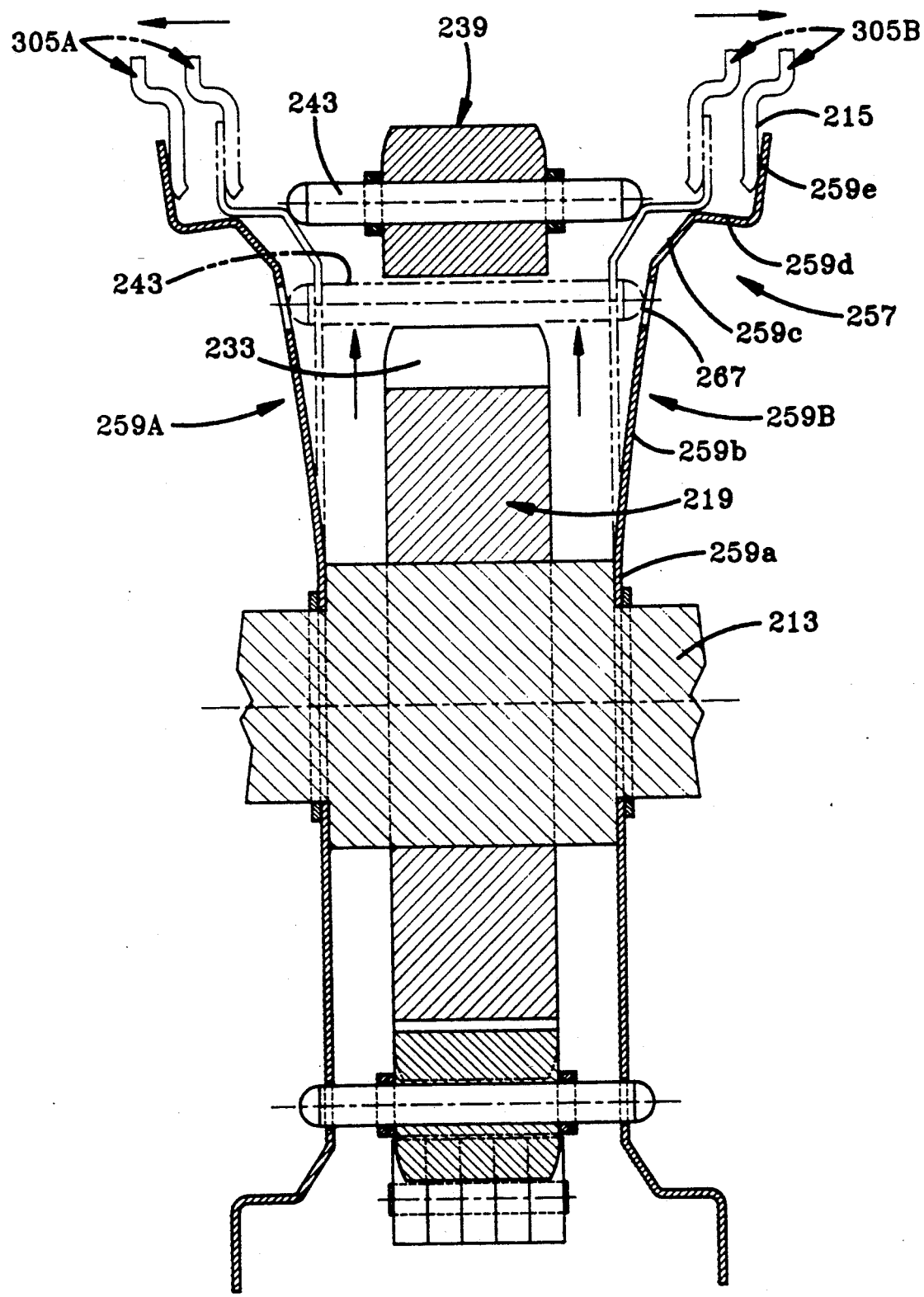
FIG. 6 is an enlarged vertical cross section taken substantially along line 6—6 of FIG. 5 depicting the interaction of the resilient disk and a reaction pin in not only the retaining mode, but also the derailing mode, and the converse thereof, the insertion mode.
Figure 7:
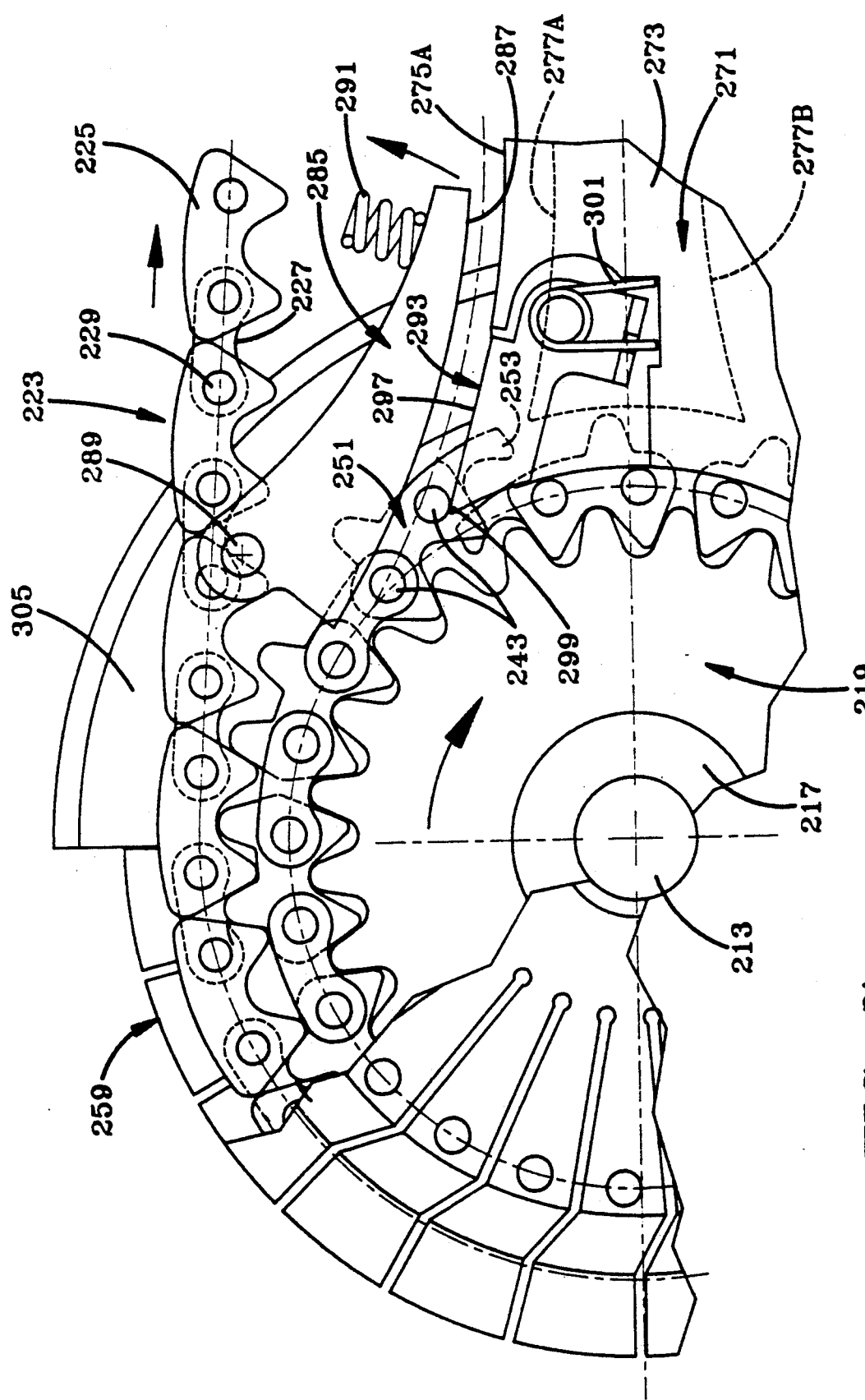
FIG. 7 is an enlarged area of FIG. 5 depicting the interaction of the leading end block with an ejector and an opposed tensioner at the initiation of the derailing mode.
Figure 10:
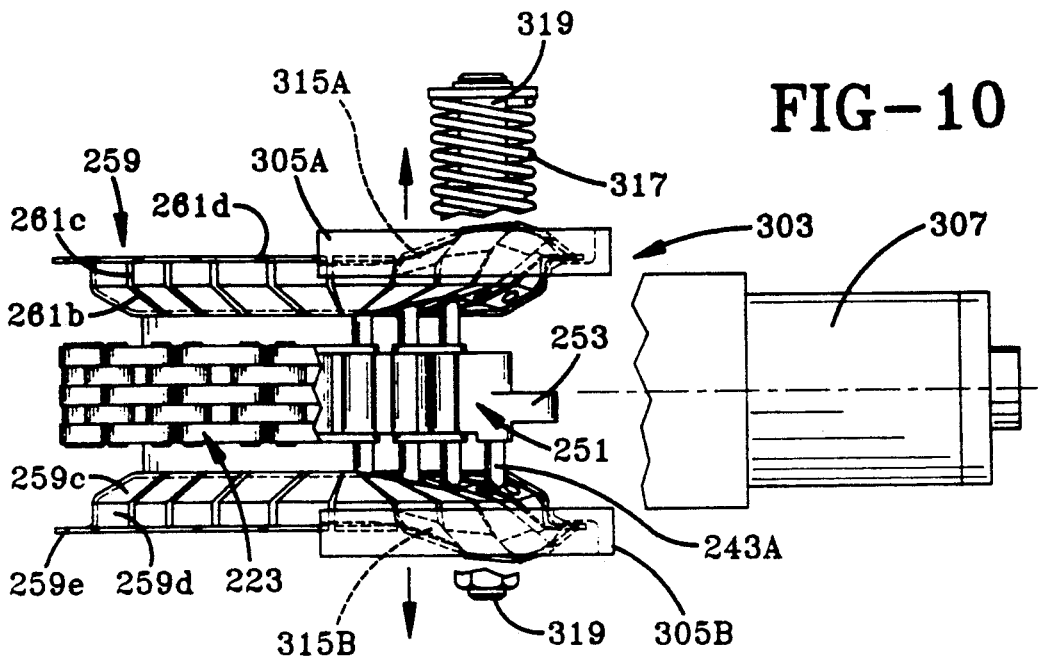
FIG. 10 is a top plan view, of reduced size, of the mechanism depicted in FIG. 7, but showing the interaction of the shift actuator with the resilient disks of the containment means as the initiation of the derailing mode.
Figure 11:
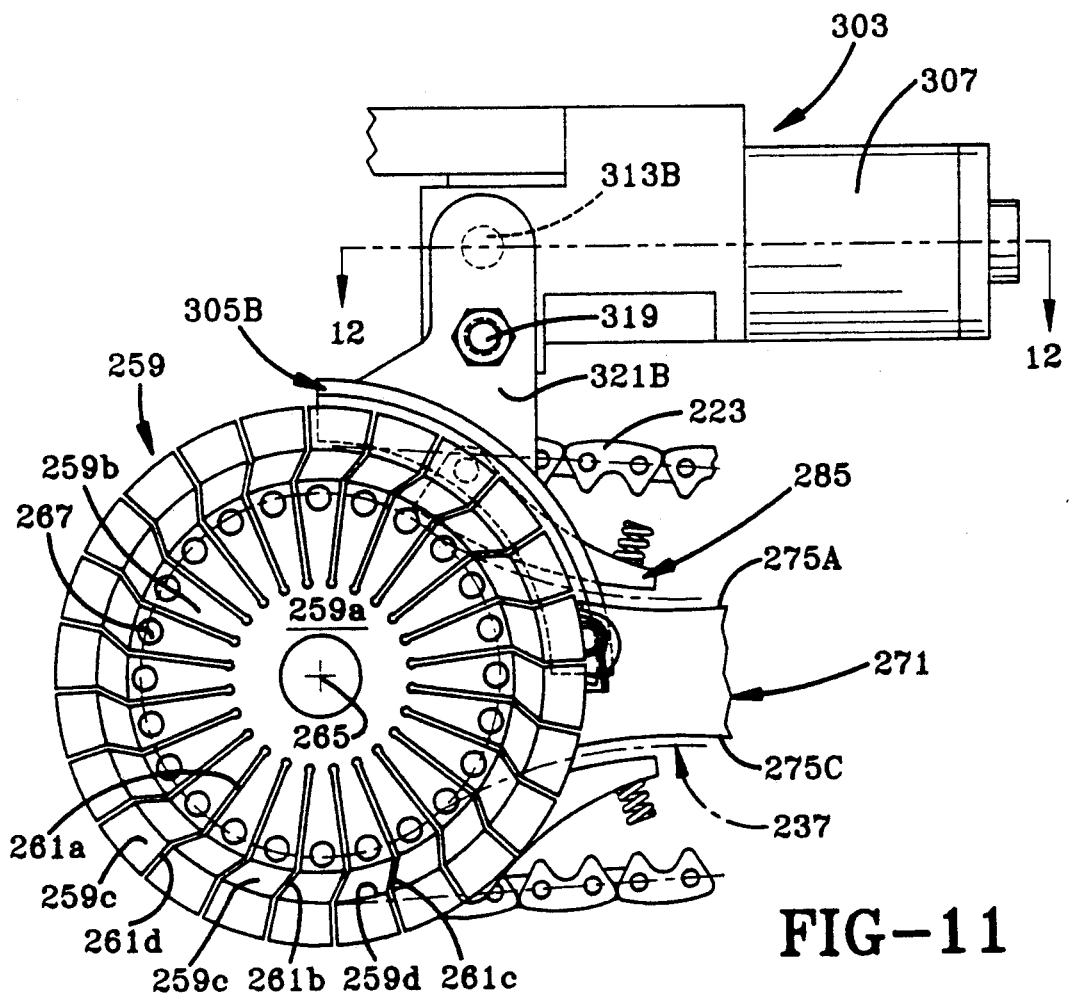
FIG. 11 is a side elevation of the mechanism depicted in FIG 10.

A shift actuator 303, which is detailed in FIGS. 11–12 and which is associated with each sprocket 219 and 221, has a pair of spring biased shoes 305 which may be in the general configuration of quadrant plates that selectively translate laterally (as represented in FIG. 6) to engage the radially outer end portions 259e of the resilient disks 259 associated with the sprocket about which the traveling chain 237 is circumscribed. The shoes 305 are biased by a compression spring 317 which acts upon a biasing shaft 319 that coacts with the mounting arms 321A and 321B for the respective shoes 305A and 305B. The compression spring 317 thus acts to maintain the shoes 305A and 305B out of engagement with the resilient disk 259, as best seen in FIGS. 10 and 12. However, the shoes 305 may, as shown, be translated against the biasing action of spring 317 by operation of a fluid cylinder 307 which reciprocates a conical head 309 that engages the inboard end 311 of each actuating pin 313 which is also presented from the mounting arms 321.

To shift into the maximum underdrive ratio, the fluid cylinder 307 is actuated to drive the conical head 309 outwardly into engagement with the inboard ends 311 of the support pins 313, thus driving the pins 313 apart and thereby forcing the bulbous camming surfaces 315A and 315B presented from the shoes 305A and 305B into engagement with the outer end portions 259e of the resilient disks 259A and 259B secured to the sprocket 219. This movement causes those segments 259b which are directly connected to the outer end portions 259e that are engaged by the camming surface 315 on the shoes 305 to flex laterally apart, as shown in FIG. 6, and thereby release the reaction pins 243 from the apertures 267 within which they are received.

When the reaction pin 243A, presented from the leading end block 251 of the traveling chain 237 is thus released, centrifugal force will tend to throw the tongue 253 on the leading end block 251 radially outwardly. Radial displacement of the tongue 253 on the leading end block 251 will cause the reaction pin 243A to engage the apex 299, and sequentially thereafter the directing surface 297 on the ejector 293 (FIGS. 2 and 8), such that the traveling chain 237 will pass through the egress span 281B to engage, and move along, the track 275A.

It will be noted that the torque transfer system 211 may satisfactorily operate without the use of an ejector 293. However, in order to be certain of derailment at the slowest rotational speed of the sprocket upon which the traveling chain 237 is circumscribed, an ejector 293 may be employed to translate the slightest displacement of the tongue 253, and thus the reaction pin 243A, on the leading end block 251 into the desired initiation of a shift.

Irrespective of whether or not an ejector 293 is employed, once the leading end block 251 passes through the egress span 281B, rotation of the remaining portion of the traveling chain 237 on the sprocket 219 will force the leading end block 251 along the tracks 275A and 275B until the trailing end block 255 of the traveling chain 237 is released. The lineal length of the traveling chain 237 is such that when the trailing end block 255 leaves sprocket 219, the leading end block 251 will already have passed through the ingress span 279A to engage the teeth 233 on the sprocket 221.

Because the total length of the traveling chain 237 is fixed, as a general rule the length of the tracks 275 are approximately one-half the circumference of either sprocket 219 or 221. The center distance between sprockets, as well as the pitch radii of the those sprockets, are concomitantly selected to assure that during a shift the traveling chain 237 will have engaged one sprocket before having totally disengaged from the other sprocket, and more importantly, to assure that the endless chain 223 is neither slackened nor over-tightened during the shift.

Referring to FIG. 9, when the tongue 253 on the leading end block 251 of the traveling chain 237 is positioned to wedge between the teeth 233 of sprocket 221 and the teeth 231 of the drive chain 223, The reaction pin 243A projecting from one side of the tongue 253 on the leading end block 251 will engage the respective inclined cam follower 259c of the respective disk segment 259b happens to be aligned with the ingress span 279.

As the leading end block 251 is captured between the endless drive chain 223 and the sprocket 221, the reaction pin 243A, and the successive reaction pins 243, will each engage successive cam followers 259c in the resilient disk 259. Such captured engagement, coupled with the continued rotation of the sprocket 221, will flex the segments 259b directly connected to the cam followers 259c until the initial, and successive, reaction pins 243 enter the appropriate apertures 267. This entry allows the disk segments 259b to spring back to their normal position, whereupon the traveling chain 237 will begin to circumscribe and be contained on the sprocket 221.

It should be noted that by employing the canted portion 261b of the slot 261, none of the reaction pins 243 will attempt to enter any slot 261, but rather each reaction pin 243 will slide along one cam follower 259c, and the segment 259b directly associated therewith, until each successive reaction pin 243 aligns with and enters an aperture 267.

A kinematic study will reveal that there is a change in the length of the path of the traveling chain 237 during the transition from one sprocket to the other. The tensioners 285 are provided to absorb this dynamic change in the length of the path of the traveling chain 237 during the transition from one sprocket to the other. Thus, at the moment, when the length of the traveling chain path is shortened, as results when the traveling chain 237 begins to circumscribe itself about the sprocket which is rotating at a higher rotational velocity, as does the sprocket on the driven shaft in the overdrive situation, the tensioners 285 will move outwardly away from the tracks 275 to effect an accommodation for the apparent, momentary change in the length of the traveling chain path during the shift.

With the traveling chain 237 having been moved from sprocket 219 to sprocket 221, a shift from the maximum underdrive to the maximum overdrive ratio will have been accomplished. In order to provide proper mating of the traveling chain 237 with the teeth 233 of sprocket 219 or 221, the leading end block 251, and the tongue 253 presented therefrom, must approach the pitch circle 283 of each sprocket 219 or 221 tangentially. This is accomplished by the angular disposition of the arcuate track 275 as it terminates in tangential alignment with the pitch circle 283.

When it is desired to shift speeds and return the traveling chain 237 to the sprocket 219, the shifting operation is reversed, but that shift is accomplished in the same manner heretofore described.

The configuration of the traveling chain 237 in the torque transmission system 211 and its interaction with the drive chain 223 and the sprockets 219 and 221 not only has the advantage of providing a solid design with noise reduction but also an automatic derailing system that eliminates the need for gates.

The embodiments of the invention in which an exclusive property or privilege is claimed are defined as follows:

1. A torque transmission system for operatively connecting laterally spaced driving and driven shaft means, said system comprising:
   a sprocket mounted on each said shaft;
   each said sprocket having radially extending teeth located along the circumference thereof;
   an endless flexible chain which cooperatively interacts with said teeth on said sprockets;
   a traveling chain adapted cooperatively to interact with said teeth on either of said sprockets and having cogs which cooperatively interact with the endless flexible chain along that portion of said traveling chain which engages the teeth on either said sprocket;
   said traveling chain having a leading end and a trailing end which define the length of said traveling chain such that it will substantially circumscribe either of said sprockets;
   derailing and locking means being provided for selectively disengaging the leading end of said traveling chain from whichever of said sprockets is circumscribed by said traveling chain during driving movement of said endless chain for permitting transfer of the traveling chain between the sprockets; and
   guide means disposed between the sprockets for guiding said traveling chain during transfer from one sprocket to the other sprocket and being self-adjusting to accommodate a variable path length over which the traveling chain traverses.

2. The torque transmission system defined in claim 1 and said guide means further comprising:
   an inner track portion and two outer track portions, said outer track portions being pivotally mounted and spring loaded toward the inner track portion to provide a self-adjusting mechanism.

3. A torque transmission system for operatively connecting laterally spaced driving and driven shaft means, said system comprising:
   a sprocket mounted on each said shaft; each said sprocket having radially extending teeth located along the circumference thereof;
   an endless flexible chain which cooperatively interacts with said teeth on said sprockets;
   a traveling chain adapted cooperatively to interact with said teeth on either of said sprockets and having cogs which cooperatively interact with the endless flexible chain along that portion of said traveling chain which engages the teeth on either said sprocket;
   said traveling chain having a leading end and a trailing end which define the length of said traveling chain such that it will substantially circumscribe either of said sprockets;
   means for selectively disengaging the leading end of said traveling chain; and
   guide means disposed between the sprockets for providing a flexible path between the sprockets to accommodate a speed deferential between the sprockets during the transfer.

* * * * *